United States Patent [19]

Shiraishi et al.

[11] Patent Number: 5,276,889
[45] Date of Patent: Jan. 4, 1994

[54] MICROPROCESSOR HAVING BUILT-IN SYNCHRONOUS MEMORY WITH POWER-SAVING FEATURE

[75] Inventors: Taketora Shiraishi; Eiichi Teraoka; Toru Kengaku, all of Itami, Japan

[73] Assignee: Mitsubishi Denki Kabushiki Kaisha, Tokyo, Japan

[21] Appl. No.: 543,273

[22] Filed: Jun. 25, 1990

[30] Foreign Application Priority Data

Jun. 26, 1989 [JP] Japan .................. 1-163536

[51] Int. Cl.$^5$ .................. G06F 1/32; G06F 1/04
[52] U.S. Cl. .................. 395/750; 395/550; 364/226.9; 364/945.9; 364/948.3; 364/950.3
[58] Field of Search .................. 395/375, 425, 750, 550

[56] References Cited

U.S. PATENT DOCUMENTS

| | | | |
|---|---|---|---|
| 4,507,727 | 3/1985 | Magar | 395/800 |
| 4,545,030 | 10/1985 | Kitchin | 395/550 |
| 4,685,058 | 8/1987 | Lee et al. | 395/375 |
| 4,750,112 | 6/1988 | Jone et al. | 395/375 |
| 4,858,105 | 8/1989 | Kuriyama et al. | 395/375 |
| 5,125,083 | 6/1992 | Fite et al. | 395/375 |
| 5,148,529 | 9/1992 | Ueda et al. | 395/375 |

*Primary Examiner*—Parshotam S. Lall
*Assistant Examiner*—Krisna Lim
*Attorney, Agent, or Firm*—Townsend and Townsend Khourie and Crew

[57] ABSTRACT

A microprocessor, including a synchronous type memory having several parts, includes a power saving feature that places at least some parts of the memory in a non-operating state when instructions not requiring access to the memory are executed. An enable signal is generated when access is not required and a signal supplying circuit supplies a synchronous signal when the enable signal is not generated and supplies a signal in a predetermined state to place at least some parts or all parts of the memory in the non-operating state to reduce power consumption.

7 Claims, 8 Drawing Sheets

MICROPROCESSOR HAVING BUILT-IN SYNCHRONOUS MEMORY WITH POWER-SAVING FEATURE

BACKGROUND OF THE INVENTION

1. Field of the Invention

The present invention relates to a microprocessor incorporating a synchronous type memory on the same chip.

2. Description of the Related Art

FIG. 1 is a timing chart showing a state of operation of a two-port RAM which was reported as "Two-port data RAM of DSSP1" in National Convention Record, 1985, The Institute of Electronics and Communication Engineers of Japan as an example of a conventional microprocessor.

A synchronous type memory constituted with a two-port RAM pre-charges bit line, drives word line, operates sense amplifier- and the like on a machine cycle basis, for example, using four-phase clocks of a general purpose speech signal processor (DSSP1: Digital Speech Signal Processor). Hereinafter specific description is made thereon.

Here, one machine cycle is divided into four durations T1, T2, T3 and T4 responding to each duration of high level "H" of four-phase clocks.

In the duration T1, pre-charge of bit lines and decode of an address signal is performed as shown in FIG. 1(a) and FIG. 1(b), respectively.

In the duration T2, the bit lines are discharged to read data into the bit, lines as shown in FIG. 1(d), and during the duration T2 through the duration T4, word lines are driven as shown in FIG. 1(c).

Also, during the durations T3 and T4, operation of a sense amplifier and operation of an output buffer are performed as shown in FIG. 1(e) and FIG. 1(f), respectively.

Needless to say, power is consumed attending on a level change of each signal line during the above-described one machine cycle.

FIG. 2 is a block diagram showing a configuration of a synchronous type memory performing the operations as described above.

In FIG. 2, numeral 9 designates a one-chip microprocessor, which is constituted by incorporating a CPU 10, a synchronous type memory 3 and the like.

The CPU 10 is constituted within an instruction register 1, an instruction decoder 2, an ALU (Arithmetic and Logic Unit) which is not illustrated and the like.

The instruction register 1 holds an instruction to be executed. Also, the instruction decoder 2 decodes the instruction held in the instruction register 1.

The synchronous type memory 3 is constituted with an address decoder 31, a sense amplifier 32, a pre-charging circuit 33, a memory cell array 34 and the like, and stores various data in the memory cell array 34.

Numeral 4 designates address signal lines, which input an address signal representing the memory location of data to be accessed by the CPU 10 in the synchronous type memory 3 to the address decoder 31.

The address decoder 31 decodes the address signal inputted through the address signal lines 4, and outputs the decoded result to the memory cell array 34 through word lines 35.

Numeral 5 designates output data signal lines. A signal of data read from the memory cell array 34 is amplified by the sense amplifier 32, being outputted to the output data signal lines 5.

Numeral 6 designates four-phase clock lines, which transmit a four-phase clock to the above-described address decoder 31 and the pre-charging circuit 33 and the sense amplifier 32 as described later.

The pre-charging circuit 33 pre-charges bit lines 36 of the memory cell array 34.

In such a one-chip microprocessor 9, the synchronous type memory 3 performs reading operation all the time in synchronism with the clock given through the four-phase clock lines 6 even in the duration when it is not accessed by the CPU 10.

In the conventional microprocessor incorporating the synchronous type memory as described above, even when the CPU does not necessitate an access to the synchronous type memory, the synchronous type memory performs reading operation by a clock supplied on a cycle basis. This means that it performs sequential operations for reading data of bit line pre-charge, address decode and word line drive on a cycle bases. For this reason, there exists a problem of consuming unnecessary power.

In the light of such circumstances, for example, the invention of the Japanese Patent Application Laid-Open No. 63-26716(1988) purposing a reduction in power consumption of the microprocessor has been proposed.

This invention of the Japanese Patent Application Laid-Open No. 63-26716(1988) detects a function block in the microprocessor which does not operate in decoding an instruction, and does not make the block operate by stopping supply of the clock, and thereby power consumption is curtailed.

However, this invention of the Japanese Patent Application Laid-Open No. 63-26716(1988) is constituted in a manner that clock supply to each function block in the microprocessor is distributed by a clock distributing circuit, and the clock supply to each function block is stopped by this clock distributing circuit. Accordingly, in the above-described invention of the Japanese Patent Application Laid-Open No. 63-26716(1988), the clock supply to each function block is stopped on a function block basis.

Then, in the above-described Japanese Patent Application Laid-Open No. 63-26716(1988), a built-in synchronous type memory is not shown as a function block in the microprocessor, but in the microprocessor incorporating a large capacity memory on the chip, the greater part of the power thereof is consumed by the memory. Then, it is considered that this invention of the Japanese Patent Application Laid-Open No. 63-26716(1988) is applied to the microprocessor incorporating the synchronous type memory as a function block, but in this case, clock supply to the whole of the memory is stopped. However, as shown in FIG. 2, the memory is normally divided into the portions of the address decoder, the word line driving circuit, the bit line pre-charging circuit, the sense amplifier and the like. For this reason, where clock supply is stopped uniformly for the whole memory as described above, supply and stop of clock in response to the status of each portion of the memory cannot be carried out, and therefore various troubles might take place.

For example, in a circuit construction in which addresses are decoded during durations of "H" of the clock and the word lines are driven during durations of "L" of the clock, the word lines are desirably made non-active, in other words, the clock supply is desirably stopped at its state of "H" in order to protect the stored contents of the memory. However, when the clock supply is stopped to do so, the decoder is put intact in the operated state, and there is possibility of power consumption.

SUMMARY OF THE INVENTION

The present invention has been achieved in the light of such circumstances, and purposes to provide a microprocessor which curtails power consumption by eliminating wasteful power consumption as described above, and can supply and stop clock in response to the status of each portion of a built-in synchronous type memory.

A microprocessor of the present invention is constituted in a manner that an enable signal is made non-active when a built-in synchronous type memory is not required to be accessed, and by giving this signal to the whole or part of the memory, supply of a synchronous signal (clock) to that portion is stopped. Thereby, when an instruction to be executed does not necessitate an access to the memory, the whole or part of the memory is not operated, and therefore no power is consumed, and the respective portions are put in the stopped state in an optimum state, and therefore the contents of the memory earl be protected.

The above and further objects and features of the invention will more fully be apparent from the following detailed description with accompanying drawings.

DESCRIPTION OF THE PREFERRED EMBODIMENTS

Hereinafter, detailed description is made on the present invention based on drawings showing embodiments thereof.

Figure 1:
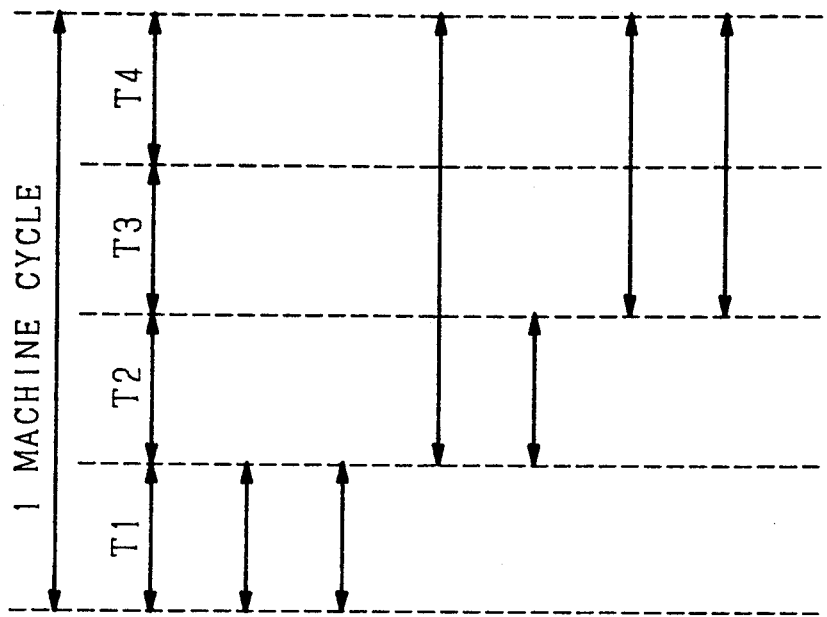
FIG. 1 is a timing chart showing a state of operation of a conventional microprocessor.
Figure 2:
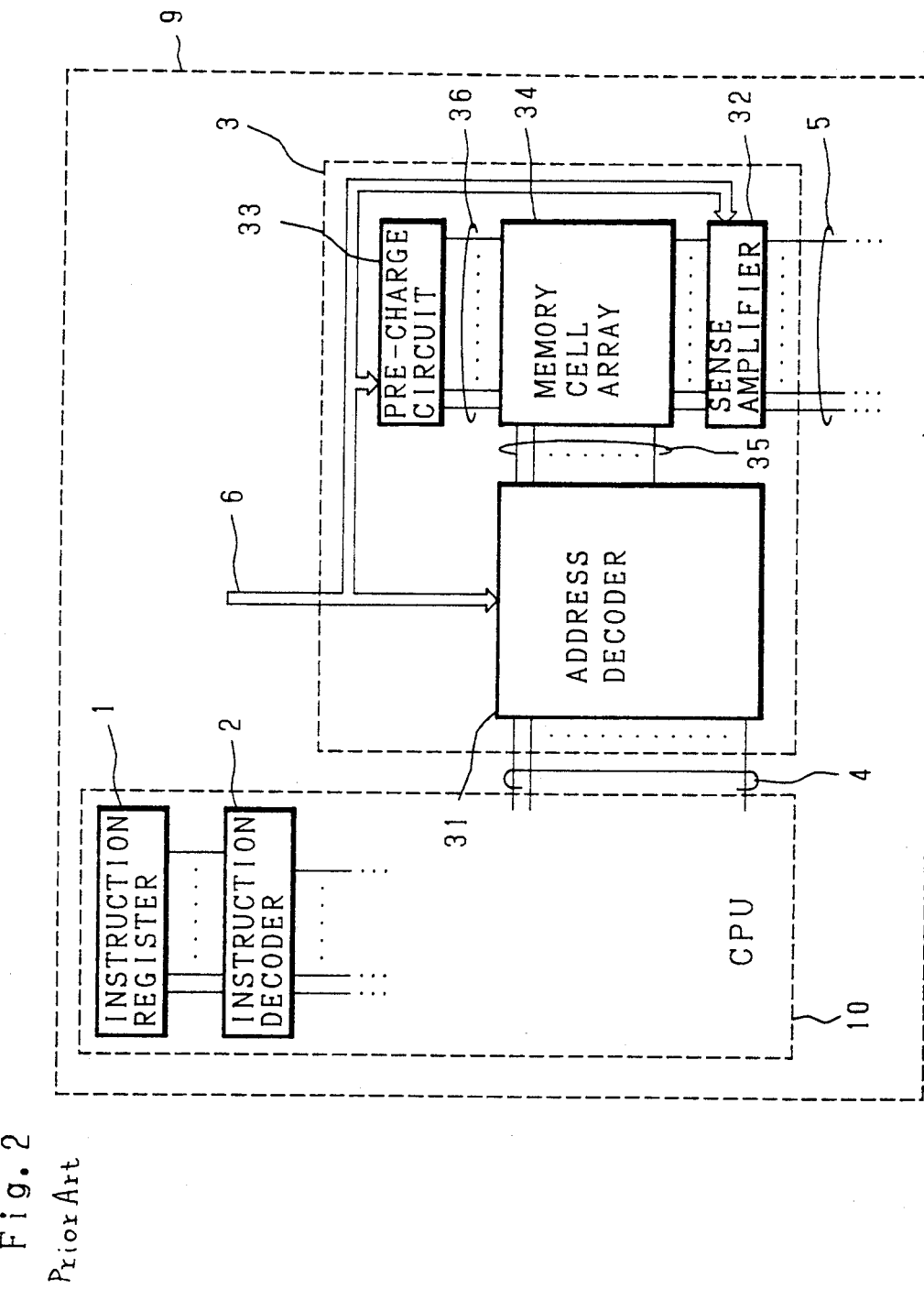
FIG. 2 is a block diagram showing a configuration example of the same.
Figure 3:
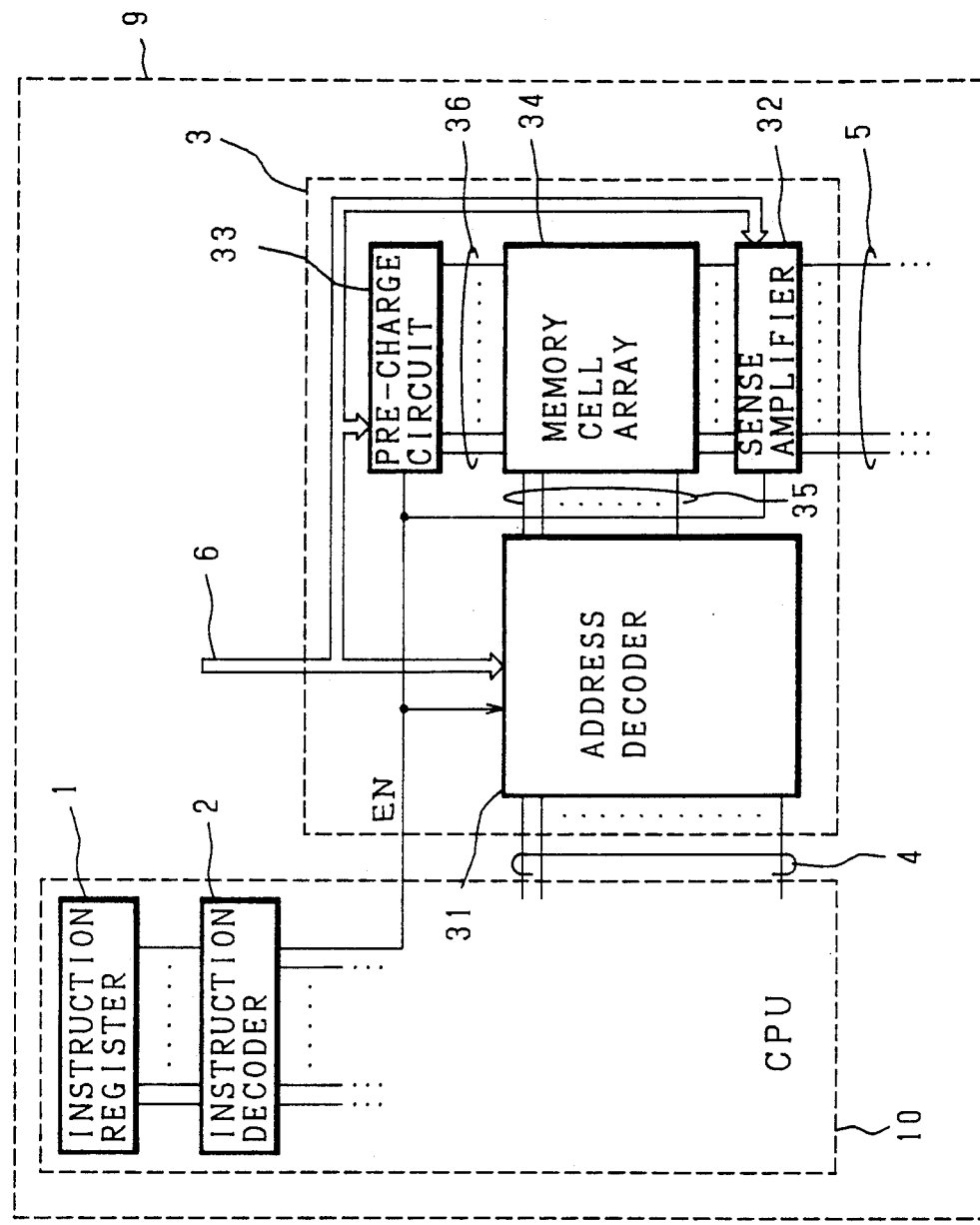
FIG. 3 is a block diagram showing a configuration example of a microprocessor of the present invention.

FIG. 3 is a block diagram showing a configuration example of a microprocessor of the present invention incorporating a synchronous type memory.

In FIG. 3, numeral 9 designates a one-chip microprocessor, which is constituted by incorporating a CPU 10, a synchronous type memory 3 and the like.

The CPU 10 is constituted with an instruction register 1, an instruction decoder 2, an ALU (Arithmetic and Logic Unit) which is not illustrated and the like.

The instruction register 1 holds an instruction to be executed. Also, the instruction decoder 2 decodes the instruction held in the instruction register 1.

The synchronous type memory 3 is constituted with an address decoder 31, a sense amplifier 32, a pre-charging circuit 33, a memory cell array 34 and the like, and stores various data in the memory cell array 34.

Numeral 4 designates address signal lines, which input an address signal representing the memory location of data to be accessed by the CPU 10 in the synchronous type memory 3 to the address decoder 31.

The address decoder 31 decodes the address signal inputted through address signal lines 4, and outputs the decoded result to the memory cell array 34 through word lines 35. In addition, the circuit configuration of the address decoder 31 is described later.

Numeral 5 designates output data signal lines. A signal of data read from the memory cell array 34 is amplified by the sense amplifier 32, being outputted to the output data signal lines 5.

Numeral 6 designates four-phase clock lines, which transmits a four-phase clock to the above-described address decoder 31, the pre-charging circuit 33 and the sense amplifier 32 as described later and the like.

The pre-charging circuit 33 pre-charges bit lines 36 of the memory cell array 34. In addition, the circuit configuration of the pre-charging circuit 33 is described later.

Then, an enable signal EN is outputted from the instruction decoder 2 to the address decoder 31 and the precharging circuit 33 through an enable signal line 7, respectively. At decoding an instruction, in the case where the instruction is executed, the instruction decoder 2 judges whether or not an access to the synchronous type memory 3 is required, and when it is required, the instruction decoder 2 makes the enable signal EN outputted to the enable signal line 7 be active ("H" in this embodiment), and when not required, the instruction decoder 2 makes the enable signal EN be non-active ("L" in this embodiment).

Figure 4:
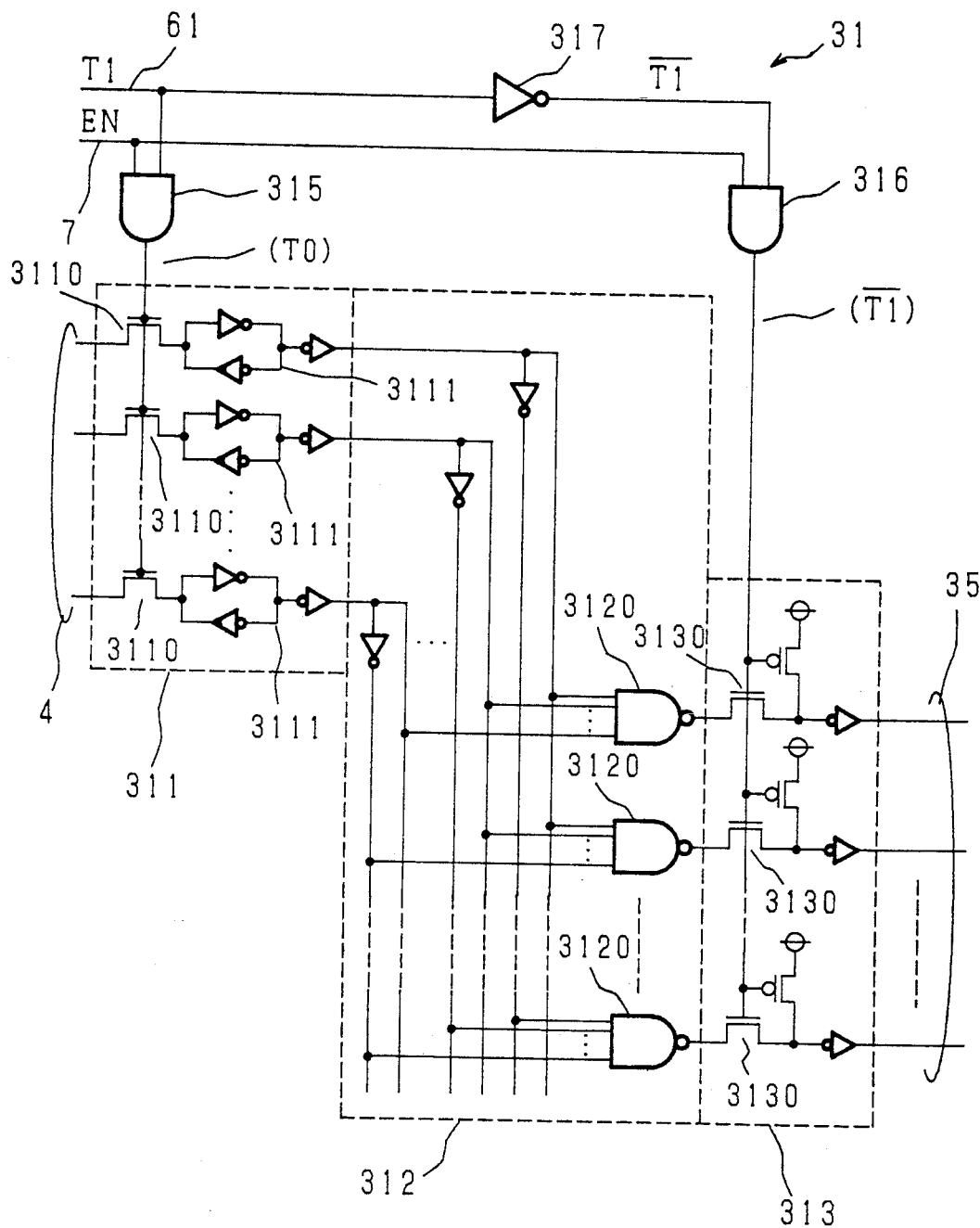
FIG. 4 is a circuit diagram showing a configuration of an address decoder of the same.

FIG. 4 is a circuit diagram showing a circuit configuration of the address decoder 31.

Numeral 61 designates a clock line transmitting a clock T1 among the four-phase clock lines 6, which is connected to one input of each of two-input AND gates 315 and 316. The enable signal line 7 is connected to the other input of each of the AND gates 315 and 316. In addition, the clock line 61 is connected to the AND gate 316 through an inverter 317.

An output of the AND gate 315 is given to an address latch 311.

The address latch 311 latches an address signal inputted through the address signal lines 4. Specifically, a gate transistor 3110 and a ratio latch 3111 are connected in series in this sequence from the input side in correspondence to each bit of the address signal lines 4. Then, a circuit is so constituted that open/close control of each gate transistor 3110 is performed by an output signal of the AND gate 315.

Accordingly, only during a duration when the enable signal EN being one input of the AND gate 315 is high level ("H") and the clock T1 being the other input of the AND gate 315 given through the clock line 61 is high level ("H"), the output signal of the AND gate 315 also turns to high level ("H"), and each gate transistor 3110 of the address latch 311 is opened, and therefore the address signal is latched in each ratio latch 3111 of each bit of the address signal lines 4 during this time.

In other words, the AND gate 315 functions as a means for stopping the supply of clock to the address latch 311.

The address signal latched in each ratio latch 3111 of the address latch 311 is given to a decode part 312.

The decode part 312 outputs a word line select signal respectively from each NAND gate 2120 to a word line driving circuit 313 by properly performing logical operation of an output of each ratio latch 3111 of the address latch 311 by a NAND gate 3120.

The word line driving circuit 313 is a circuit which drives each word line 35 according to the word line select signal outputted from the decode part 312, and an access gate 3130 which is open/close-controlled by an output signal of the AND gate 316 is inserted into each word line 35.

Accordingly, only during a duration when the enable signal EN being one input of the AND gate 316 is high level ("H") and a clock T1 of the clock line 61 being the other input given while inverted through the inverter 317 is high level ("H") (clock T1 is low level ("L"), the output signal of the AND gate 316 turns to high level ("H"), and each access gate 3130 of the word line driving circuit 313 is opened, and the word line 35 is driven.

In other words, the AND gate 316 functions as a means for stopping the supply of clock to the word line driving circuit 313.

Figure 5:
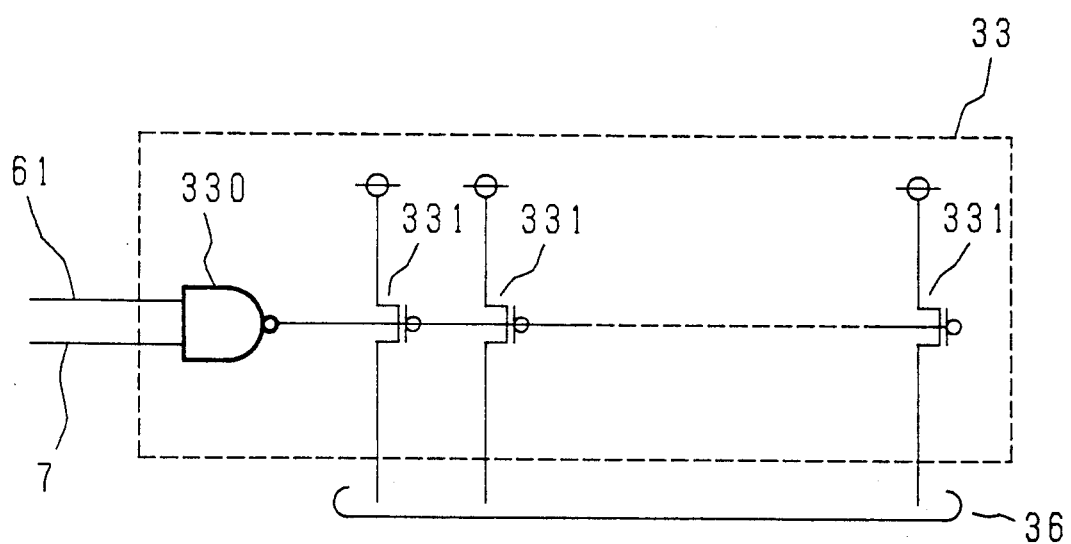
FIG. 5 is a circuit diagram showing a configuration of a pre-charging circuit of tile same.

FIG. 5 is a circuit diagram showing a configuration of the pre-charging circuit 33 of bit lines.

The pre-charging circuit 33 is constituted with a two-input NAND gate 330 to inputs of which the enable signal line 7 and the clock line 61 are connected, and a low-active gate 331 of each bit line which is open/close-controlled by the output signal of the NAND gate 330. One end of each gate 331 is connected to the power source potential, and the other end is connected to each bit line 36.

Accordingly, only during a duration when the enable signal EN given through the enable signal line 7 is high level ("H") and the clock T11 given through the clock line 61 is high level ("H"), the output signal of the NAND gate 330 turns to low level ("L"), and each gate 331 is opened, and each bit line 36 is pre-charged.

Figure 6:
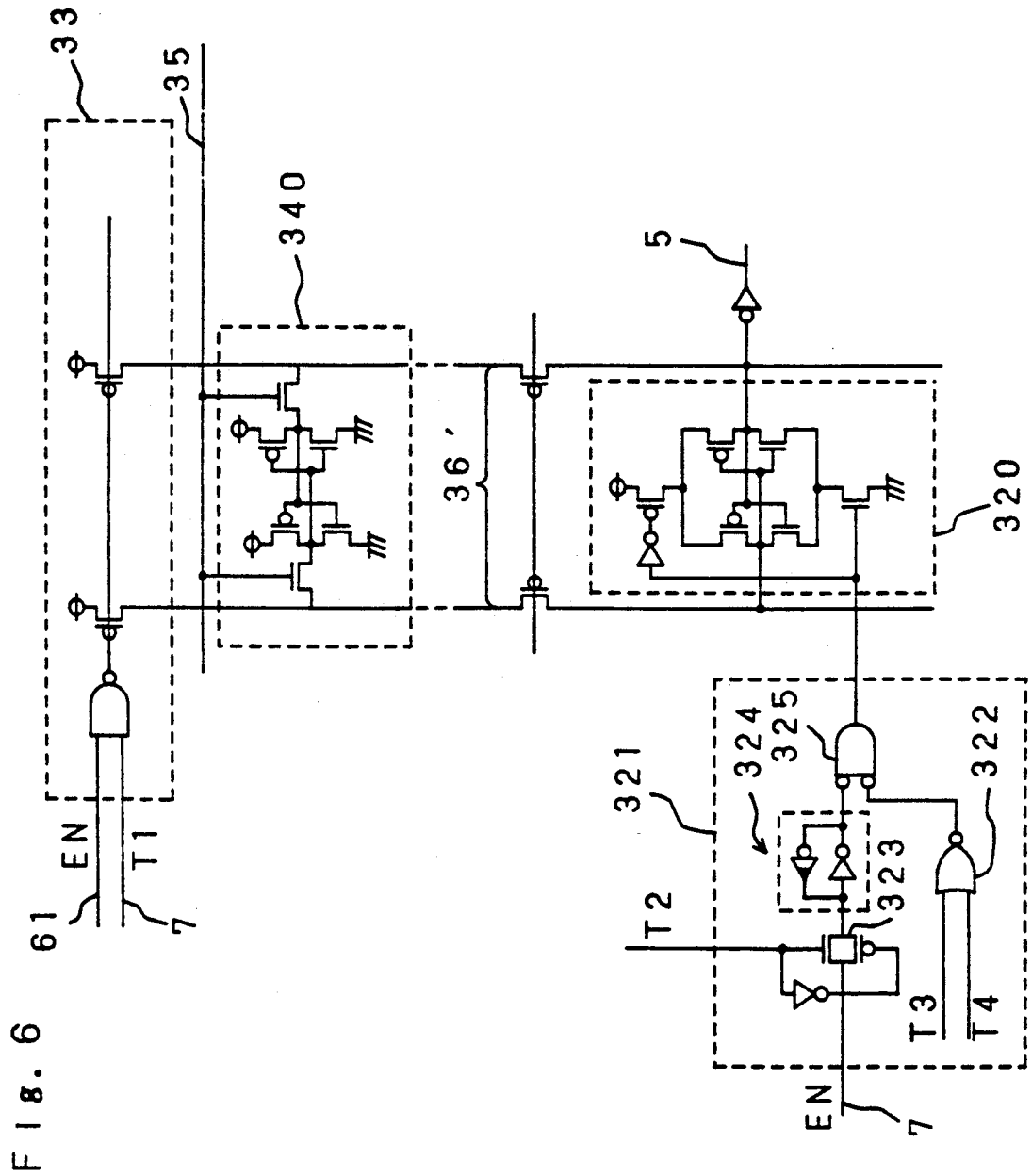
FIG. 6 is a circuit diagram showing a circuit configuration of one bit of a memory cell array, that is, a circuit configuration of a memory cell and one bit of a sense amplifier corresponding thereto.

FIG. 6 is a circuit diagram showing a circuit configuration for one bit of the memory cell array 34, that is, a circuit configuration of a memory cell 340 and one bit 320 of the sense amplifier 32 corresponding thereto.

Each memory cell 340 is located at a point of intersection point of a pair of bit lines 36' of the bit lines 36 pre-charged by the above-described pre-charging circuit 33 and the word line 35 connected to the address decoder 31. When the pair of bit lines 36' and the word line 35 are selected, the memory cell 340 located at the intersection point of the both is selected, and the signal (high level or low level) stored therein is outputted to a one-bit circuit 320 of the sense amplifier 32 through the pair of bit lines 36'.

The one-bit circuit 320 of the sense amplifier 32 amplifies a difference of levels of the pair of bit lines 36', outputting it to the output data signal lines 5.

Operation of the one-bit, circuit 320 of the sense amplifier 32 is controlled by a sense amplifier driving circuit 321.

The sense amplifier driving circuit 321 is constituted with a NOR gate 322, a gate circuit 323, a latching circuit 324 and a NOR gate 325.

The NOR gate 322 is of two inputs inputting a clock T3 and a clock T4, and the output thereof is connected to one of input terminals of the NOR gate 325.

In the gate circuit 323, the input is connected to the enable signal 7, and the output is connected to the latching circuit 324 respectively, and this circuit is open/close-controlled by a clock T2.

In the latching circuit 324, the input is connected to the gate circuit 323, and the output is connected to the other input terminal of the NOR gate 325.

The sense amplifier driving circuit 321 latches an inverted signal of the enable signal EN into the latching circuit 324 at a timing of a rise of the clock T2. Accordingly, the both inputs of the NOR gate 325 turns to low level during a duration when the enable signal EN is active (high level) and the clock T3 or clock T4 turns to high level, and therefore the output thereof turns to high level. When the output of the NOR gate 325 is high level, a transistor Tr 1 of the one-bit circuit 320 of the sense amplifier 32 is put in the conductive state, and the one-bit circuit 320 of the sense amplifier 32 is put in the operated state.

Operation of the microprocessor of the present invention constituted as described above is as follows.

An instruction taken in the instruction register 1 is executed sequentially, but the microprocessor of the present invention performs pipeline processing, and therefore the cycle whereon the instruction is decoded differs from the cycle whereon the instruction is executed.

In this embodiment, when an instruction is decoded by the instruction decoder 2 in the decode cycle, in the case where an access to the synchronous type memory 3 is required in executing the instruction, the instruction decoder 2 makes the enable signal EN be active ("H"), and in the case where not required, the instruction decoder 2 makes the enable signal EN be non-active ("L").

The enable signal EN is given to the address latch 311 and the word line driving circuit 313 of the address decoder 31 of the synchronous type memory 3, the pre-charging circuit 33 and the sense amplifier 32 through the enable signal line 7.

Hereinafter, description is made in reference to a timing chart in FIG. 7.

When the enable signal EN as shown in FIG. 7(i) is active ("H"), the synchronous type memory 3 operates in synchronism with the four-phase clock T1, T2, T3 and T4 which are given through the four-phase clock lines 6. In addition, the four-phase clock T1, T2, T3 and T4 are of nonoverlap type as shown in FIG. 7(a), (b), (e) and (d) in that order.

Figure 7:
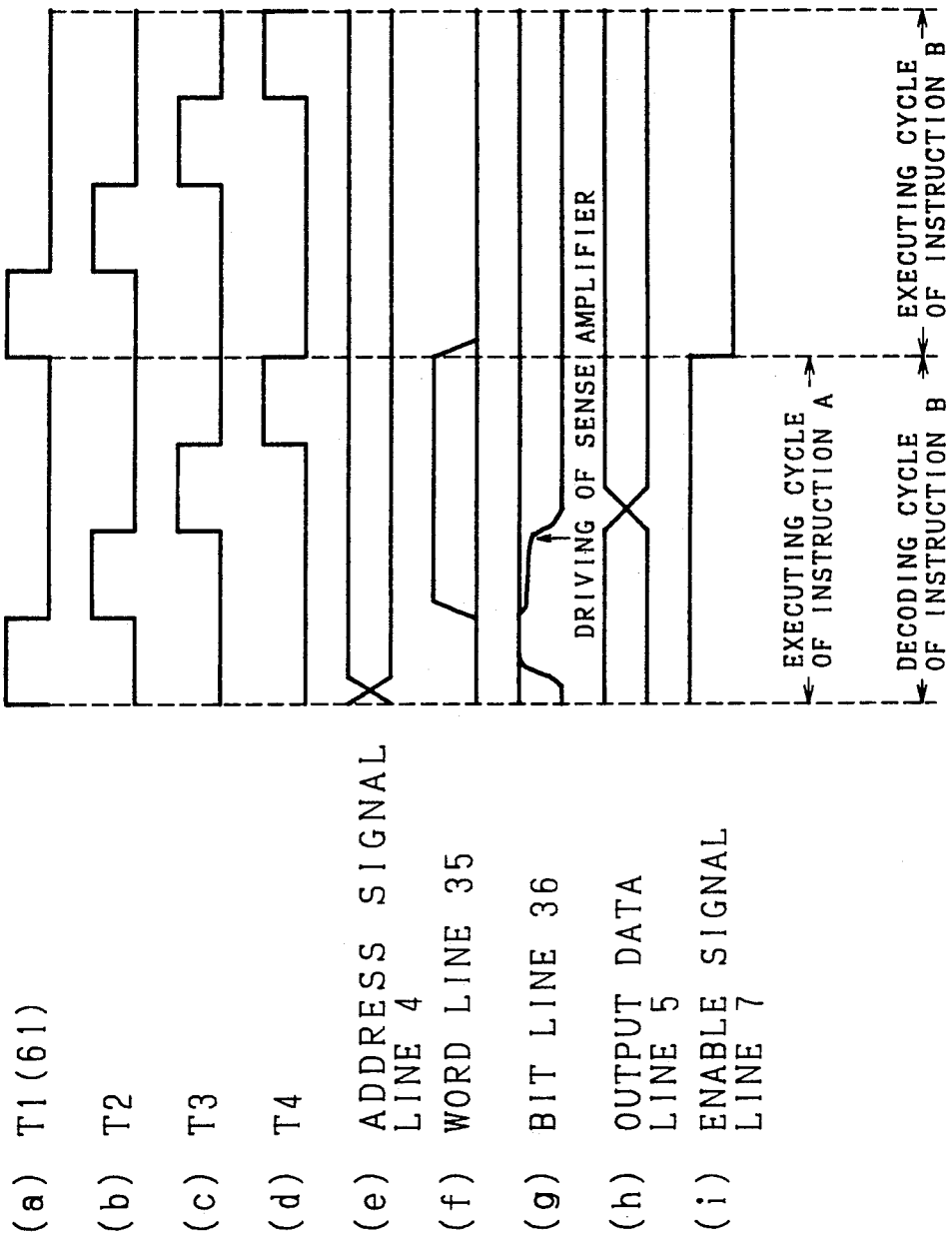
FIG. 7 is a timing chart showing a state of operation of the microprocessor of the present invention.

At a timing of a rise of the clock T1, each address signal of the address signal lines 4 is changed, and this is latched in the address latch 311 as shown in FIG. 7(i e), and pre-charge of the bit lines 36 is started by the pre-charging circuit 33 as shown in FIG. 7(g).

At a timing of a rise of the clock T2, pre-charge of the bit lines 36 is completed as shown in FIG.7 (g), and the word line driving circuit 313 is driven as shown in FIG. 7(f). By driving the word lines 35, data of the memory cell array 34 is outputted to the sense amplifier 32 through the bit lines 36.

During a duration from a timing of a rise of the clock T3 to "H" of T4, the sense amplifier 32 is driven as shown in FIG. 7(g), and data is outputted to the output data signal lines 5 as shown in FIG. 7(h).

On the other hand, when the enable signal EN is non-active ("L"), the output signal of the AND gate 315 turns to low level, and each gate 3110 of the address latch 311 is put in the non-conductive state. Accordingly, the address latch 311 does not accept an input of the address signal from the address signal lines 4. Also, the output signal of the AND gate 316 turns to low level, and the word line driving circuit 313 is not driven. Furthermore, the output of the sense amplifier driving circuit 321 turns to low level, and the sense amplifier 32 is not driven also.

For example, in FIG. 7, it, is assumed that an instruction A necessitates an access to the synchronous type memory 3, and an instruction B does not necessitate an access to the synchronous type memory 3. In the cycle of executing the instruction A, the enable signal EN is made active ("H") by the instruction decoder 2. Accordingly, an access to the synchronous type memory 3 is performed as described above. However, in the cycle of executing the instruction B, the enable signal EN turns to non-active ("L"), and therefore decoding of the address signal by the address decoder 31 is not performed, and the word line driving circuit 313 is not driven also.

Also, the bit line pre-charging circuit 33 is not driven. Furthermore, the sense amplifier 32 is not driven.

Thus, in the microprocessor of the present invention, when the synchronous type memory 3 is not accessed, clock supply to each part of the synchronous type memory 3 can be stopped in the state responding to the respective situations, and therefore decoding of the address and pre-charge of the bit lines are not performed, and thereby the power consumption is curtailed, and drive of the word lines is stopped, and thereby protection of the contents of the memory is carried out more reliably.

In addition, in the above-described embodiment, the enable signal line 7 is connected to the address decoder 31, the pre-charging circuit 33 and the like, and when no access is performed to the synchronous type memory 3, the enable signal EN is made non-active, and thereby each unit is put in the non-operated state, but by adopting a configuration of stopping operation of any one alone, the power consumption of the portion put in the non-operated state is curtailed.

Figure 8:
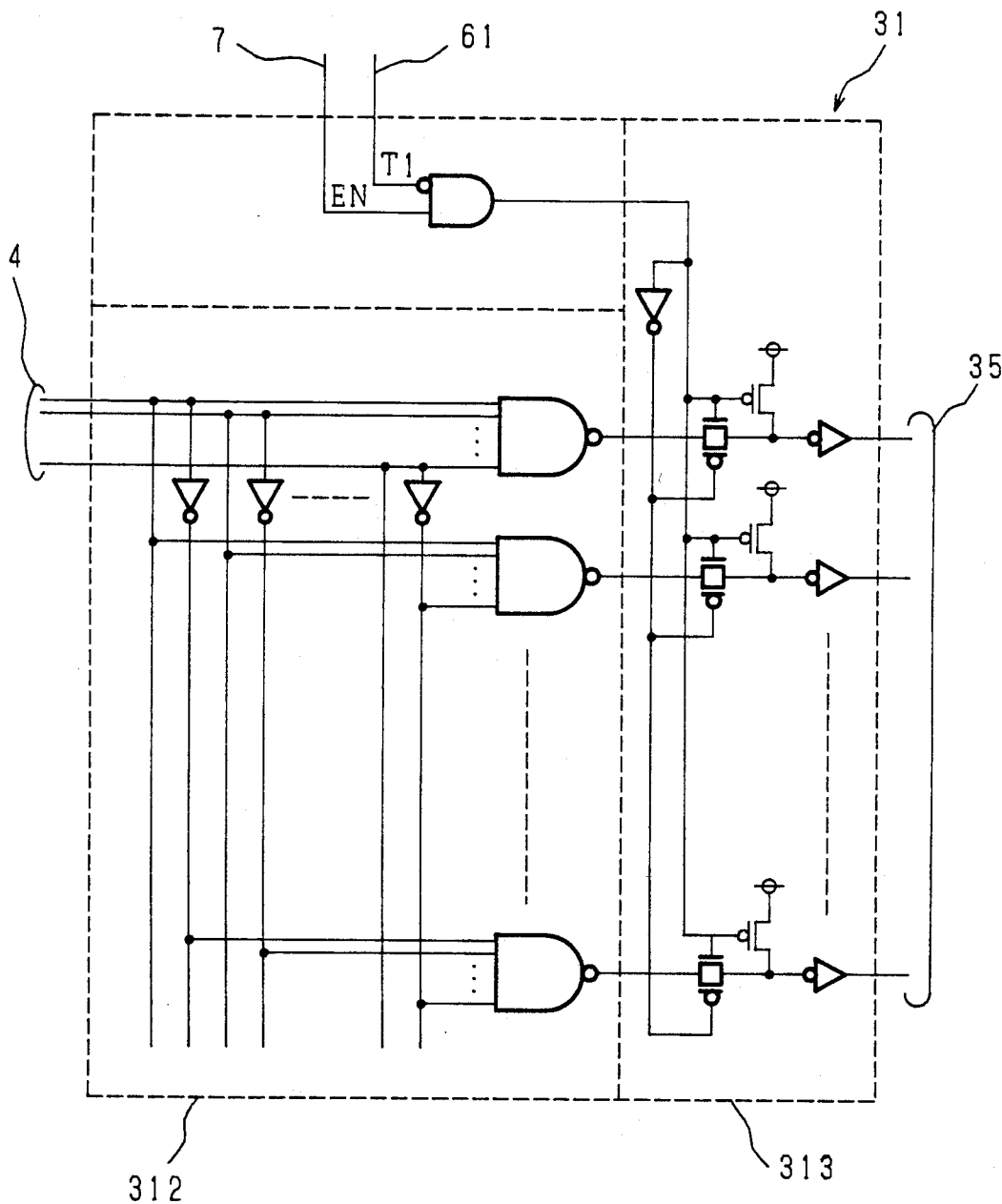
FIG. 8 is a circuit diagram showing another configuration example of the address decoder.

Also, as shown in FIG. 8, the address decoder 31 as shown in FIG. 4 is constituted so that supply and stop of the clocks are possible only for the word line driving circuit 313, and only the word line driving circuit 313 is put in the operation-stopped state when the enable signal EN is non-active, and thereby a power consumption equivalent thereto is also curtailed.

Furthermore, in the above-mentioned embodiment, description is made on the operation when data is read from the synchronous type memory 3, and the operation when data is written to the synchronous type memory 3 is performed likewise.

As detailed above, in accordance with the microprocessor of the present invention, when an instruction to be processed necessitates no access to the synchronous type memory, the clock supply to the whole or part of the synchronous memory is stopped, and thereby it is put in the non-operated state, and therefore the power consumption of the portion put in the non-operated state is curtailed, and the clock supply can be stopped in the state optimum for the individual portion of the synchronous type memory, and therefore the present invention is suitable also from the point of protecting the memory contents and the like.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A microprocessor comprising:

a synchronous type memory which operates in synchronism with a set of synchronized clock signals with said synchronous type memory having a first part which is in an operating state when a received first control signal is in a first state and in a non-operating state when the received first control signal is in a second state and has a second part which is in an operating state when a received second control signal is in a first state and in a non-operating state when the received second control signal in a second state;

a pipeline instruction execution mechanism, having a decoding stage for decoding instructions and an execution stage for executing instructions;

signal generating means, included in the decoding stage of said pipeline and responsive to an instruction being decoded, for generating a predetermined signal when a previously decoded instruction, necessitating no access to said memory, is executed at said executing stage; and means, coupled to said signal generating means to receive said predetermined signal, for supplying a given clock signal, being in either a first or second state and included in said set of clock synchronized clock signals, as said received first control signal and an inverted given clock signal as said received second control signal when said predetermined signal is not generated and for stopping supply of said set of synchronized clock signals to said memory when said predetermined signal is generated and providing said first and second control signals in said second state to place said first and second parts in the non-operating state to reduce the power consumption of the synchronous type memory.

2. The microprocessor of claim 1 wherein:

said synchronous signal includes a first clock signal having a magnitude equal to either a first or second value;

a first part of said synchronous memory is in an operating state when a received first control signal has a first value and is in a non-operating state when a received control signal has a second value, a second part of said synchronous memory is in an operating state when a received second control signal has a first value and is in a non-operating state when a first control signal has a second value; and said means for receiving said predetermined signal includes means for providing said first clock signal as the received first control signal and an inverted first clock signal as said received second control signal when said predetermined signal is not generated and for providing received first and second control signals having a second value when said predetermined signal is generated so that both said first part and said second parts of said synchronous memory are in non-operating states to reduce power consumption when said predetermined signal is generated.

3. The microprocessor of claim 1 wherein said means for supplying comprises:

a first logic circuit, having a first input coupled to said signal generating means, a second input coupled to received said given clock signal, and an output for providing said first control signal, for supplying said given clock signal as said first control signal when said predetermined signal is not generated and setting said first control signal to said second state when said predetermined signal is generated; and a second logic circuit, having a first input coupled to said signal generating means, a second input coupled to receive said inverted given clock signal, and an output for providing said second control signal, for supplying said inverted given clock signal as said second control signal when said predetermined signal is not generated and setting said second control signal to said second state when said predetermined signal is generated.

4. A microprocessor comprising:

a synchronous type memory which has
- a memory cell array storing data at a storage location having an address specified by a word line and a bit line,
- an address decoder having a decoding part for decoding a received address and generating a decoded result and a word line driving circuit part for selectively driving said word lines in response to the decoded result of said decoding part,
- a pre-charging circuit part for precharging each bit line, and
- a sense amplifier part for amplifying data signals output from said memory cell array to said bit line, with said decoding part, said word line driving circuit part, said precharging circuit part, and said sense amplifier part being parts of said synchronous type memory where said synchronous type memory operates in synchronism with a synchronous signal, with each of said parts responsive to control signals to switch from operating to non-operating states;

an instruction decoder for decoding instructions;

operation means for executing the instructions decoded by said instruction decoder;

signal generating means, included in the instruction decoder and responsive to an instruction being decoded, for generating a pre-determined signal when an instruction necessitating no access to said memory is executed at said operation means; and means, coupled to said signal generating means to receive said predetermined signal, for stopping supply of said synchronous signal to each of said parts of said synchronous type memory and for supplying control signals to place each of said parts in the non-operating state when said predetermined signal is generated to reduce power consumption of said synchronous memory.

5. The microprocessor of claim 4 wherein:

said synchronous signal includes a first clock signal having a magnitude equal to either a first or second value;

said decoding part is in an operating state when a received first control signal has a first value and is in a non-operating state when a received control signal has a second value, said word line driving part is in an operating state when a received second control signal has a first value and is in a non-operating state when a first control signal has a second value; and said means for receiving said predetermined signal includes means for providing said first clock signal as the received first control signal and an inverted first clock signal as said received second control signal when said predetermined signal is not generated and for providing received first and second control signals having a second value when said predetermined signal is generated so that both said decoding part and said word line driving part are in non-operating states to reduce power consumption when said predetermined signal is generated.

6. A microprocessor comprising:

a synchronous type memory which has
- a memory cell array storing data at a storage location having an address specified by a word line and a bit line,
- an address decoder having a decoding part for decoding a received address and generating a decoded result and a word line driving circuit part for selectively driving said word lines in response to the decoded result of said decoding part,
- a pre-charging circuit part for pre-charging each bit line, and
- a sense amplifier part for amplifying data signals output from said memory cell array to said bit lines, where said synchronous type memory operates in synchronism with a synchronous signal with said decoding part, said word line driving circuit part, said pre-charging circuit part, and said sense amplifier part being parts of said synchronous type memory;

an instruction decoder for decoding instructions;

operating means for executing the instructions decoded by said instruction decoder;

signal generating means, included in the instruction decoder and responsive to an instruction being decoded, for generating a pre-determined signal when an instruction, necessitating no access to said memory, is executed at said operation means; and means, coupled to said signal generating means to receive said predetermined signal, for stopping supply of said synchronous signal to fewer than all the parts of said synchronous type memory when said predetermined signal is generated to place fewer than all of the parts of said synchronous memory in the non-operating state to reduce the power consumption of the synchronous type memory.

7. A microprocessor comprising:

a synchronous type memory including a plurality of parts, said plurality of parts including a decoding part, a word line drive circuit part, and a pre-charge circuit part, said synchronous type memory operating in synchronism with a set of synchronized clock signals;

a pipeline instruction execution mechanism, having a decoding stage for decoding instructions and an execution stage for executing instructions;

signal generating means, included in the decoding stage of said pipeline and responsive to an instruction being decoded, for generating a predetermined signal when a previously decoded instruction, necessitating no access to said memory, is executed at said executing stage; and means, coupled to said signal generating means to receive said predetermined signal, for stopping supply of said set of synchronized clock signals to a selected one of said plurality of parts in said memory when said predetermined signal is generated to place one of said plurality of parts selected in a non-operating state to reduce power consumption of the synchronous type memory.

* * * * *